(12) United States Patent
Jourdain et al.

(10) Patent No.: US 8,820,077 B2
(45) Date of Patent: Sep. 2, 2014

(54) SATURATED STEAM THERMODYNAMIC CYCLE FOR A TURBINE AND AN ASSOCIATED INSTALLATION

(75) Inventors: Vincent Jourdain, Paris (FR); Jérôme Colin, Noisy le Roi (FR); Hoan Levan, Paris (FR)

(73) Assignee: ALSTOM Technology Ltd, Baden (CH)

( * ) Notice: Subject to any disclaimer, the term of this patent is extended or adjusted under 35 U.S.C. 154(b) by 313 days.

(21) Appl. No.: 13/331,398

(22) Filed: Dec. 20, 2011

(65) Prior Publication Data

US 2012/0256420 A1    Oct. 11, 2012

(30) Foreign Application Priority Data

Dec. 30, 2010    (FR) ...................... 10 61383

(51) Int. Cl.
| | | |
|---|---|---|
| *G21D 5/00* | (2006.01) | |
| *F01K 7/34* | (2006.01) | |
| *F01K 7/22* | (2006.01) | |
| *F01K 3/18* | (2006.01) | |
| *F22B 1/12* | (2006.01) | |

(52) U.S. Cl.
CPC ................ *F01K 7/223* (2013.01); *Y02E 30/30* (2013.01); *F01K 3/181* (2013.01); *F22B 1/123* (2013.01)
USPC ................ 60/644.1; 60/653; 60/654; 60/662; 60/678; 60/679

(58) Field of Classification Search
CPC ............. F01K 3/181; F01K 7/02; F01K 7/04; F01K 7/22; F01K 7/223; F01K 7/24; G21D 1/00; G21D 1/006; Y02E 30/30
USPC ................ 60/644.1, 653, 654, 677–680, 676, 60/662–663
See application file for complete search history.

(56) References Cited

U.S. PATENT DOCUMENTS

| | | | | |
|---|---|---|---|---|
| 3,818,698 A | * | 6/1974 | Beckmann et al. ............. | 60/659 |
| 4,164,848 A | * | 8/1979 | Gilli et al. ........................ | 60/652 |
| 4,295,281 A | * | 10/1981 | Potter ............................. | 34/371 |
| 2003/0043952 A1 | | 3/2003 | Itou et al. | |

FOREIGN PATENT DOCUMENTS

| | | |
|---|---|---|
| CA | 2481522 A1 | 4/2006 |
| FR | 2682459 A1 | 4/1993 |
| GB | 743869 A | 1/1956 |
| JP | 62218606 A | 9/1987 |

* cited by examiner

Primary Examiner — Hoang Nguyen

(57) ABSTRACT

A saturated steam or weakly superheated steam thermodynamic cycle in an electricity generating plant includes at least a nuclear energy source and a turbine having at least a high-pressure module, a medium-pressure module and a low-pressure module. The steam flows successively through the high-pressure, medium-pressure and low-pressure modules. The steam undergoes a first drying and/or superheating cycle between the high-pressure and medium-pressure modules and also a second cycle comprising at least a drying and/or a superheating process between the medium-pressure module and the low-pressure module.

9 Claims, 3 Drawing Sheets

Figure 1 - *Prior art*

SATURATED STEAM THERMODYNAMIC CYCLE FOR A TURBINE AND AN ASSOCIATED INSTALLATION

RELATED APPLICATION

The present application hereby claims priority under 35 U.S.C. Section 119 to French Patent application number 1061383, filed Dec. 30, 2010, the entire contents of which are hereby incorporated by reference.

FIELD OF INVENTION

The technical field of the invention is that of saturated steam or weakly superheated steam thermodynamic cycles in a plant for generating electricity from nuclear energy.

BACKGROUND

The problem of optimizing a saturated steam thermodynamic cycle in a plant for generating electricity from nuclear energy has been tackled by means of a number of methods and devices, notably by using a drying and/or superheating stage in a saturated steam thermodynamic cycle in a plant of this kind between a high-pressure turbine module and a lower-pressure turbine module, and by installing an associated device.

Methods and devices of this kind make use of live steam; that is to say, the steam from the boiler is used to superheat the steam between the high pressure and the lower pressure parts.

Thus, in known configurations, of which a known variant is shown in FIG. 1, a dryer 70 and a superheater 80 are placed between a high-pressure module 30 and a medium-pressure module 40, and are adapted to dry and superheat the steam output by the high-pressure module, this steam being generated by a steam generator 140 upstream of said high-pressure module, said steam generator 140 being supplied by a nuclear energy source 140'. Additionally, for the purpose of superheating, the superheater 80 is supplied with live steam through a pipe 270 connected to the outlet of the steam generator 140.

The drawbacks of these methods and associated devices include, notably, the requirement for a high degree of superheating to enable the steam to flow through the lower-pressure turbine without rapidly generating water droplets which would have negative effects on efficiency and which would also tend to degrade the turbine. Furthermore, the use of live steam for superheating has little effect on the efficiency of the nuclear cycle, because this energy is recovered in the form of heat alone, and is not converted into electricity. This is because, whereas the steam in a fossil fuel powered electricity generating plant is reheated directly by the boiler, thus increasing the mean temperature of the heat exchange and improving the efficiency of the cycle, superheating by live steam in a nuclear-powered plant can only degrade the thermodynamic cycle. However, superheating can reduce the losses due to the moisture content in the final expansion stages. This positive effect is greater than the negative effect due to the degradation of the cycle in correctly optimized plants. Furthermore, this analysis confirms the greater importance of drying, which contributes to a reduction of the losses due to moisture content in the downstream expansion stages.

SUMMARY

The present disclosure is directed to a saturated steam or weakly superheated steam thermodynamic cycle, in an electricity generating plant. The plant includes at least a nuclear energy source and a turbine including at least a high-pressure module, a medium-pressure module and a low-pressure module, the steam flowing successively through the high-pressure, medium-pressure and low-pressure modules. The steam undergoes a first drying and/or superheating cycle between the high-pressure and medium-pressure modules. The steam undergoes a second cycle including at least one drying process between the medium-pressure module and the low-pressure module.

In another aspect, the present disclosure is directed to an electricity generating plant including at least a nuclear energy source and a turbine including at least a high-pressure module, a medium-pressure module and a low-pressure module. The modules being interconnected by a steam circuit adapted to make the steam flow successively through the high-pressure, medium-pressure and low-pressure modules. At least a dryer and/or a superheater are placed between the high-pressure and medium-pressure modules. The electricity generating plant includes at least one dryer between the medium-pressure and low-pressure modules.

BRIEF DESCRIPTION OF THE DRAWINGS

Other characteristics and advantages of the invention will become clear in the light of the following description, with reference to the attached drawings, in which.

For greater clarity, identical or similar elements are indicated by identical reference symbols in all the drawings.

Figure 1:
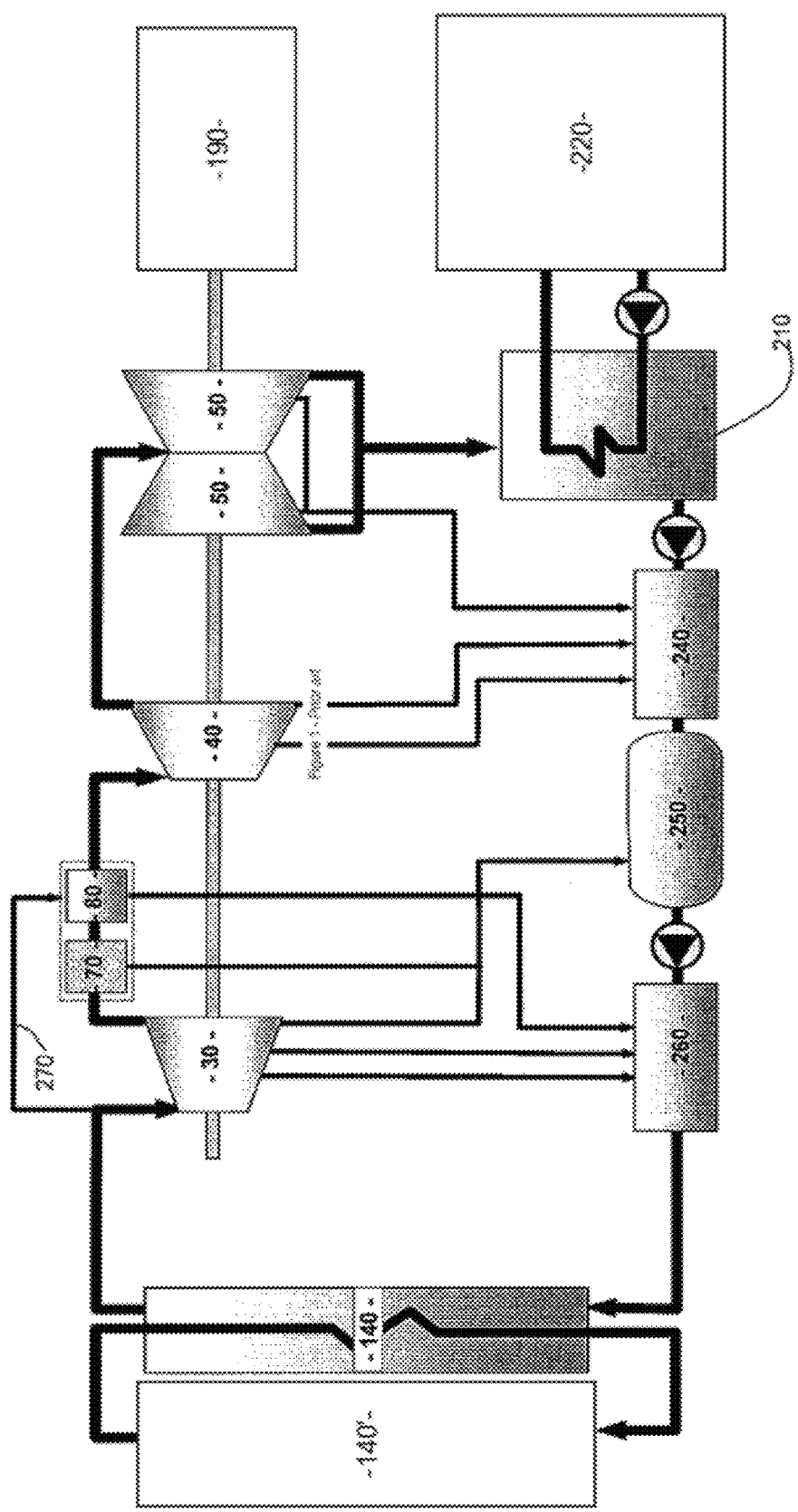
FIG. 1 shows a general diagram of the saturated steam thermodynamic cycle in an electricity generating plant according to a prior art embodiment.

DETAILED DESCRIPTION OF THE PREFERRED EMBODIMENTS INTRODUCTION TO THE EMBODIMENTS

The invention is intended to overcome the drawbacks of the prior art, more specifically the problems associated, on the one hand, with the optimization of a saturated steam or weakly superheated steam thermodynamic cycle, this cycle being adapted for use in a plant for generating electricity from nuclear energy, that is to say a plant including at least one nuclear energy source, and, on the other hand, with the use of live steam as a heat source for superheating in a thermodynamic cycle of this kind.

For this purpose, in an electricity generating plant comprising a nuclear energy source and a turbine having at least a high-pressure module, a medium-pressure module and a low-pressure module, the invention proposes a saturated steam or weakly superheated steam thermodynamic cycle wherein the steam flows sequentially through the high-pressure, medium-pressure and low-pressure modules, and the steam undergoes a first drying and/or superheating cycle between the high-pressure and medium-pressure modules. It should be noted that said first superheating cycle can be provided in a single stage using live steam, or in two stages, with steam bled from the high-pressure module being used to supply the first heating stage while the live steam is supplied to the second heating stage, the second configuration being a variant which improves the efficiency of the plant cycle.

The phrase "saturated steam or weakly superheated steam thermodynamic cycle" implies that the steam supplied by the generator can be superheated, by several tens of degrees for example.

According to a first characteristic, the saturated steam undergoes a second cycle comprising at least one drying process between the medium-pressure module and the low-pressure module.

Since the losses due to the moisture content are considerable, this cycle is designed to supplement the first drying and/or superheating cycle between the high-pressure and medium-pressure modules in order to achieve a further reduction of the moisture content of the saturated steam in the final stages of the expansion line.

According to a second characteristic, the second cycle also comprises a stage in which the steam is superheated.

Advantageously, the first cycle is optimized in such a way that the moisture content of the steam at the outlet of the medium-pressure module is kept within a certain range which enables the second cycle to be optimized. Consequently, by comparison with the prior art, the isentropic efficiency of the medium-pressure expansion is lower, but the isentropic efficiency of the low-pressure expansion is higher. Furthermore, the mechanical risks created by water in liquid form in the low-pressure module of the turbine are considerably diminished and controlled in this case.

Advantageously, the steam is in the wet steam state with a moisture content of less than 15% or a moderate degree of superheating throughout the cycle.

According to specific characteristics, the second cycle adjusts the drying and/or superheating in such a way that a moisture content substantially within the range from 5% to 15% is present at the outlet of the low-pressure turbine; and/or the first cycle adjusts the drying and/or superheating in such a way that a moisture content substantially within the range from 5% to 15% is present at the outlet of the medium-pressure turbine; and/or the expansion of the high-pressure module adjusts the moisture content so that it is substantially within the range from 5% to 15% at the outlet of the high-pressure turbine before the first cycle.

According to another characteristic, the superheating in the first cycle is provided by using steam taken from a first steam bleed point of the high-pressure module, preferably from an intermediate stage of said high-pressure module.

In an equivalent way, the superheating in the second cycle is provided by using steam from a second steam bleed point of the high-pressure module, taken from an intermediate stage downstream of the preceding first steam bleed point of the high-pressure module, this intermediate stage possibly being located at the outlet of this high-pressure module.

The invention also proposes an electricity generating plant comprising at least a nuclear energy source and a turbine having at least a high-pressure module, a medium-pressure module and a low-pressure module, the modules being interconnected by a steam circuit for passing the steam through the high-pressure, medium-pressure and low-pressure modules in succession, the plant also comprising at least one dryer between the medium- and low-pressure modules.

In a variant, the plant also comprises a superheater between the medium- and low-pressure modules.

Preferably, the plant has at least one dryer and/or one superheater between the high- and medium-pressure modules.

DETAILED DESCRIPTION

Figure 2:
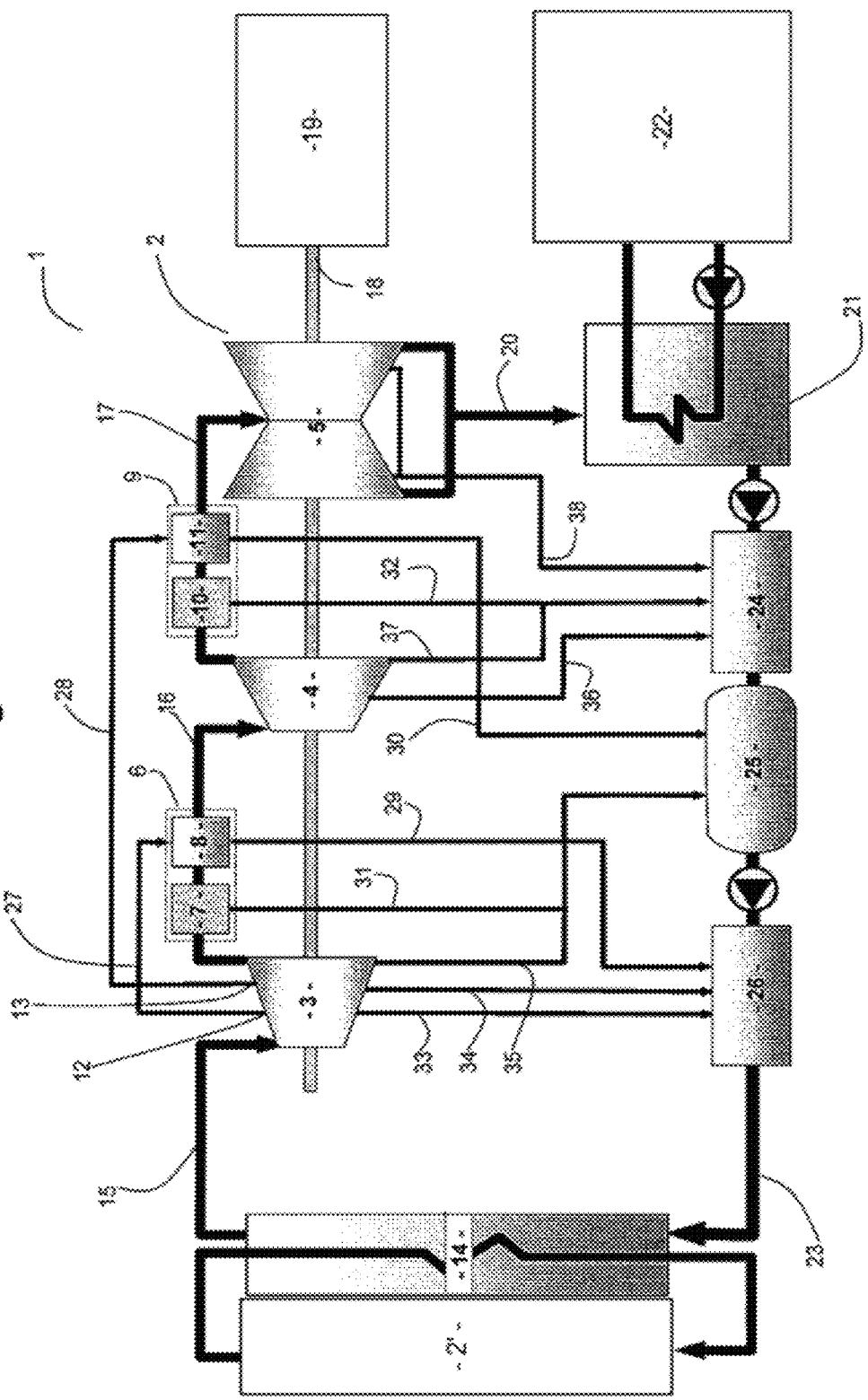
FIG. 2 shows a general diagram of the saturated steam thermodynamic cycle, in an electricity generating plant, according to present invention.

FIG. 2 shows a general diagram of the saturated steam thermodynamic cycle 1, in an electricity generating plant according to an embodiment of the present invention.

More particularly, this diagram shows a plant comprising a nuclear energy source 2' and a turbine 2 having three modules, the first being a high-pressure module 3, the second being a medium-pressure module 4, and the third being a low-pressure module 5. Throughout the cycle, the working medium, in this case water vapor, flows in succession through the high-pressure 3, medium-pressure 4 and low-pressure 5 modules.

Upstream of the thermodynamic cycle, a steam source, for example at least one steam generator 14, supplies live steam to the high-pressure module 3 through a supply pipe 15. Additionally, a first intermediate pipe 16 is placed between the outlet of the high-pressure module 3 and the inlet of the medium-pressure module 4, and a second intermediate pipe 17 is placed between the outlet of the medium-pressure module 4 and the inlets of the low-pressure modules 5, each of said pipes 16 and 17 having, respectively, a dryer 7, 10 and a superheater 8, 11. The steam flowing through the first and second intermediate pipes 16, 17 consequently undergoes a first and a second cycle 6, 9, each including a drying stage and a superheating stage. Thus the dryers 7, 10 can be used for the execution of the drying stages of the first cycle 6 and the second cycle 9 respectively, and the superheaters 8, 11 can also be used for the execution of the superheating stages of the first cycle 6 and the second cycle 9 respectively.

In this embodiment, the superheaters 8, 11 are formed by heat exchangers.

Each of the high-pressure 3, medium-pressure 4 and low-pressure 5 modules is adapted to cause the rotation of an input shaft 18 of an alternator 19 which is adapted to generate electricity.

At the outlet of the low-pressure module 5, a third intermediate pipe 20 supplies steam to a main condenser 21 associated with a heat dissipater 22. This main condenser 21 serves to convert the gaseous steam to liquid.

A pipe 23 located at the end of the thermodynamic cycle supplies the steam generator 14 from the main condenser 21, with a flow passing, respectively, through a set of low-pressure reheaters 24, a degassing tank 25 and a set of high-pressure reheaters 26.

The sets of heat exchangers 24, 25, 26 are adapted to reheat the fluid, while the degassing tank 25 also serves to reduce the concentration of oxygen and other gases in the water.

In this embodiment, the first superheater 8 through which the first intermediate pipe 16 passes is also supplied with heating steam by means of a first superheating pipe 27 connected to a first bleed point 12 of the high-pressure module 3. The first bleed point 12 for steam flowing through the first superheating pipe 27 is located at an intermediate level of the high-pressure module 3, in such a way that the superheater 8 is supplied with previously used steam, instead of live steam. Similarly, the second superheater 11 through which the second intermediate pipe 17 passes is supplied with heating steam by means of a second superheating pipe 28 connected to a second bleed point 13 of the high-pressure module, which is located downstream of the first bleed point 12. In a specific configuration, not shown in this drawing, the second bleed point 13 can be located at the outlet of the high-pressure module 3.

These first and second superheaters 8, 11 also supply condensed water to the set of high-pressure reheaters 26 and the degassing tank 25, respectively, through discharge pipes 29 and 30.

In an equivalent way, discharge pipes 31, 32 discharge the drained fluid from the dryers 7, 10 into the degassing tank 25 and the set of reheaters 24.

Similarly, the discharge pipes 33, 34 connected to the bleed points of the high-pressure module 3 supply wet steam to the set of reheaters 26. The pipe 35, which is generally connected to the discharge of the high-pressure module 3, supplies the degassing tank 25.

Finally, the discharge pipes 36, 37, connected to the bleed points of the medium-pressure module, and the discharge pipe 38, connected to the bleed points of the low-pressure modules, supply the set of reheaters 24.

Thus the steam follows the thermodynamic cycle in which the direction of flow of the various pipes is indicated by arrows. The steam is therefore used to produce work in the different modules 3, 4, 5 which are adapted to rotate the shaft 18 and impart this rotary motion to the alternator 19, as a result of which, electricity is generated in the plant.

When used, this thermodynamic cycle provides optimal efficiency if, in particular, the second cycle 9 adjusts the drying and superheating so as to provide a moisture content substantially within the range from 5% to 15% at the outlet of the low-pressure turbine 5.

In the same way, and advantageously, the first cycle 6 adjusts the drying and superheating processes in order to provide a moisture content substantially within the range from 5% to 15% at the outlet of the medium-pressure turbine 4.

According to another distinctive characteristic, the high-pressure module 3 adjusts the moisture content so that it is substantially within the range from 5% to 15% at the outlet of said high-pressure module 3 before the first cycle 6.

Figure 3:
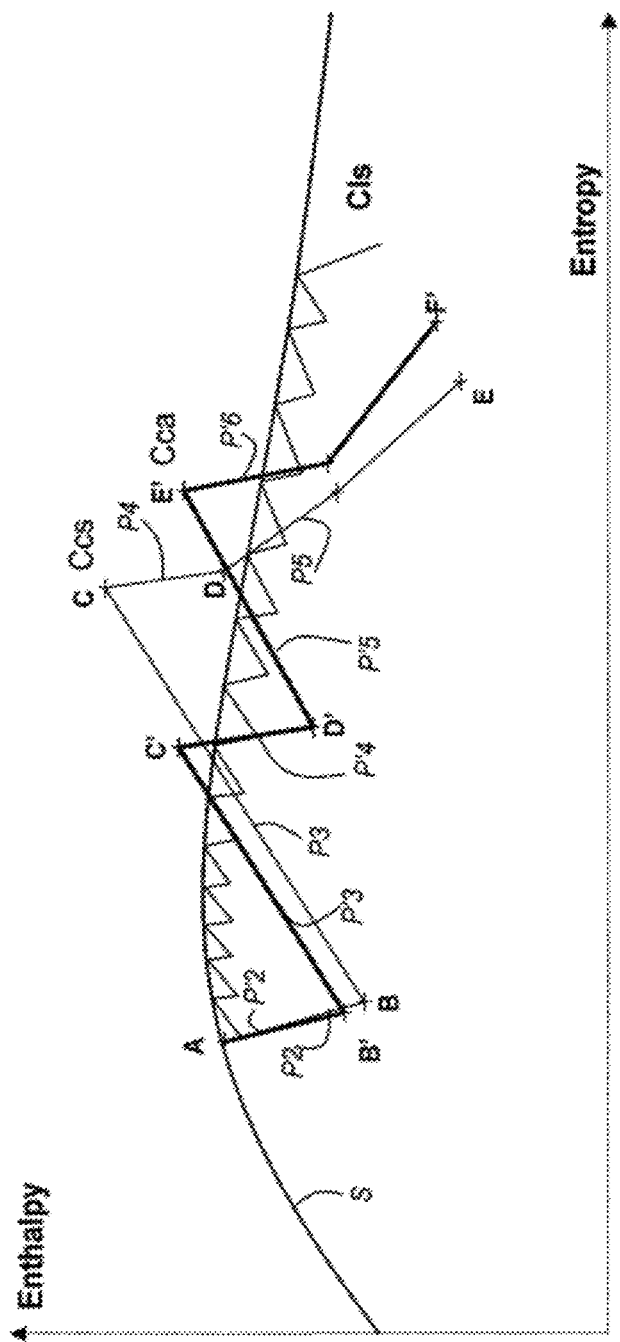
FIG. 3 shows an enthalpy diagram, known as a Mollier diagram, representing the general trend of the expansion lines in the following cases: in the ideal theoretical case, in a case according to a prior art embodiment, and in a case according to an embodiment of the invention.

FIG. 3 shows an enthalpy diagram, known as a Mollier diagram, representing the general trend of the expansion lines in the following cases: in the ideal theoretical case, in a case according to a prior art embodiment, and in a case according to an embodiment of the invention.

It should be noted that these curves only represent general trends.

The curve CIs represents the general trend of an ideal theoretical curve of the enthalpy of the steam in the cycle as a function of the corresponding entropy. The line S represents the saturation curve of the water in this diagram.

More precisely, the saturation curve S marks a boundary between two domains, the water being in the form of dry steam at higher enthalpies, and in the form of saturated steam (or wet steam) for enthalpies below the enthalpy of the curve S for a given entropy. The name "dry saturated steam" is given to the state of water which lies exactly on the saturation curve. The water content of the wet steam increases as the enthalpy decreases, until a content of 1 (liquid water) is reached when the whole vapor phase is condensed.

The curve Ccs represents the general trend of a curve in a case according to a known embodiment of the prior art, in other words with a thermodynamic cycle having only a first drying and superheating cycle 6 between the high-pressure module 3 and the medium-pressure module 4.

This curve shows a number of different trends, including:
A: The steam produced by the steam generator reaches the turbine inlet in the form of wet steam which is close to saturation; this steam is called live steam.
$P_2$: The curve describes a descending slope between the points A and B; in other words, the enthalpy decreases while the entropy increases, evidence for which is provided by the expansion of the steam in the high-pressure module.
$P_3$: The dryer 7 and the superheater 8 of the first cycle 6 imply an increase in enthalpy as a function of entropy in this section of the curve between the points B and C, resulting in its upward trend.
$P_4$: The curve describes a descending slope between the points C and D; the enthalpy decreases while the entropy increases, evidence for which is provided by the expansion of the steam in the medium-pressure module 4 of the turbine.
$P_5$: The curve describes a descending slope between the points D and E, and the enthalpy decreases while the entropy increases, this section corresponding to the expansion of the steam in the low-pressure module 5 of the turbine.

The curve Cca represents the general trend of a curve in a case according to an embodiment of the invention, in other words with a thermodynamic cycle which has, in particular,
 a first drying and superheating cycle 6 between the high-pressure module 3 and the medium-pressure module 4;
 a second drying and superheating cycle between the medium-pressure module 4 and the low-pressure module 5.

This curve describes a number of different trends, including:
A: The steam produced by the steam generator reaches the turbine inlet in the form of wet steam which is close to saturation; this steam is called live steam.
$P'_2$: The curve describes a descending slope between the points A and B; in other words, the enthalpy decreases while the entropy increases, evidence for which is provided by the expansion of the steam in the high-pressure module.
$P'_3$: The dryer 7 and the superheater 8 of the first cycle 6 imply a first increase in enthalpy as a function of entropy in this section of the curve between the points B' and C', resulting in its upward trend.
$P'_4$: The curve describes a descending slope between the points C' and D', and the enthalpy decreases when the entropy increases, evidence for which is provided by the expansion of the steam in the medium-pressure module 4 of the turbine.
$P'_5$: The dryer 10 and the superheater 11 of the second cycle 9 which takes place during the transfer of the steam from the medium-pressure modules 4 towards the low-pressure module 5 of the turbine cause a second increase in enthalpy as a function of entropy in this section of the curve between the points D' and E', resulting in its upward trend.
$P'_6$: The curve describes a descending slope between the points E' and F', and the enthalpy decreases while the entropy increases, evidence for which is provided by the expansion of the steam in the low-pressure module.

More specifically, it should be noted that the enthalpy at the point B', E(B'), is greater than the enthalpy at the point B, E(B). Similarly, it should be noted that the peak enthalpy at the point C', E(C') is lower than the peak enthalpy at the point C, E(C). The fact that a second cycle 9 can be executed downstream of the medium-pressure module 4 of the turbine makes it possible to define a lower steam superheating level in the first cycle 6, which provides illustrative evidence that no live steam bleed is required in order to supply the first superheater 8 and provide a solution to the technical problem.

Finally, this figure shows that the curve Cca representing the general trend of a curve in the case of a thermodynamic cycle having a first and a second cycle 6, 9 is a closer approximation to the curve CIs which, for an ideal cycle, represents the general trend of the enthalpy of the cycle as a function of entropy, in this ideal cycle the drying of the steam after each expansion stage to minimize losses due to moisture content, than is the curve Ccs representing the general trend of the curve in the case of a thermodynamic cycle having a single first cycle 6, which provides evidence for improved efficiency of the turbine.

Numerous modifications may be made to the embodiments described above without departure from the scope of the invention.

For example, the number of modules described above is not limiting. It would be possible to use a thermodynamic cycle comprising a second cycle in a turbine comprising more modules. In particular, the number of low-pressure modules depends on the specific conditions of the plant, and may, for example, vary between one and four without departure from the scope of the invention.

It is also possible to vary the number of pipes. For example, there may be a larger number of discharge pipes.

For reasons of size and technology, the equipment used in the first and second cycles can be arranged in parallel rows, typically two or four rows, without departure from the scope of the invention.

Finally, the arrangement of the feedwater heater shown by way of example in the drawings is a typical configuration. Other configurations, which may differ as regards the number of exchangers, the presence or absence of a degassing tank, and the level of condensate recovery from the dryers and superheaters, are possible without departure from the scope of the invention.

What is claimed is:

1. A saturated steam or weakly superheated steam thermodynamic cycle, in an electricity generating plant, comprising:
    at least a nuclear energy source, and
    a turbine including:
        at least a high-pressure module,
        a medium-pressure module, and
        a low-pressure module,
    wherein the steam flows successively through the high-pressure, medium-pressure and the low-pressure modules, the steam undergoes a first drying and/or superheating cycle between the high-pressure and medium-pressure modules, and the steam undergoes a second cycle that includes at least one drying process between the medium-pressure module and the low-pressure module, and
    wherein the superheating in the first drying and/or superheating cycle is provided by using steam taken from a first steam bleed point of the high-pressure module and the superheating in the second cycle is provided by using steam taken from a second steam bleed point of the high-pressure module.

2. The thermodynamic cycle as claimed in claim 1, wherein the second cycle includes a steam superheating stage.

3. The thermodynamic cycle as claimed in claim 1, wherein the steam is kept in a wet steam state at an outlet from the medium-pressure module.

4. The thermodynamic cycle as claimed in claim 1, wherein the first drying and/or superheating cycle adjusts the drying and/or the superheating in such a way that a moisture content substantially within a range from 5% to 15% is obtained at an outlet of the medium-pressure turbine.

5. The thermodynamic cycle as claimed in claim 1, wherein the second cycle adjusts the drying and/or the superheating in such a way that a moisture content substantially within a range from 5% to 15% is obtained at an outlet of the low-pressure turbine.

6. The thermodynamic cycle as claimed in claim 1, wherein the high-pressure module adjusts a moisture content so that it is substantially within a range from 5% to 15% at an outlet of said high-pressure module before the first drying and/or superheating cycle.

7. The thermodynamic cycle as claimed claim 2, wherein the second steam bleed point is at an intermediate stage of the high-pressure module.

8. The thermodynamic cycle as claimed in claim 1,
    wherein the second steam bleed point is downstream of the first bleed point.

9. An electricity generating plant comprising:
    at least a nuclear energy source, and
    a turbine including:
        at least a high-pressure module,
        a medium-pressure module, and
        a low-pressure module, wherein the modules are interconnected by a steam circuit adapted to make the steam flow successively through the high-pressure, medium-pressure and low-pressure modules;
    at least a dryer and a superheater located between the high-pressure and medium-pressure modules; and
    at least one second dryer and a second superheater locate between the medium-pressure and the low-pressure modules,
    wherein the superheater is provided with steam taken from a first steam bleed point of the high-pressure module and the second superheater is provided with steam taken from a second steam bleed point of the high-pressure module.

* * * * *